United States Patent Office 2,849,186
Patented Aug. 26, 1958

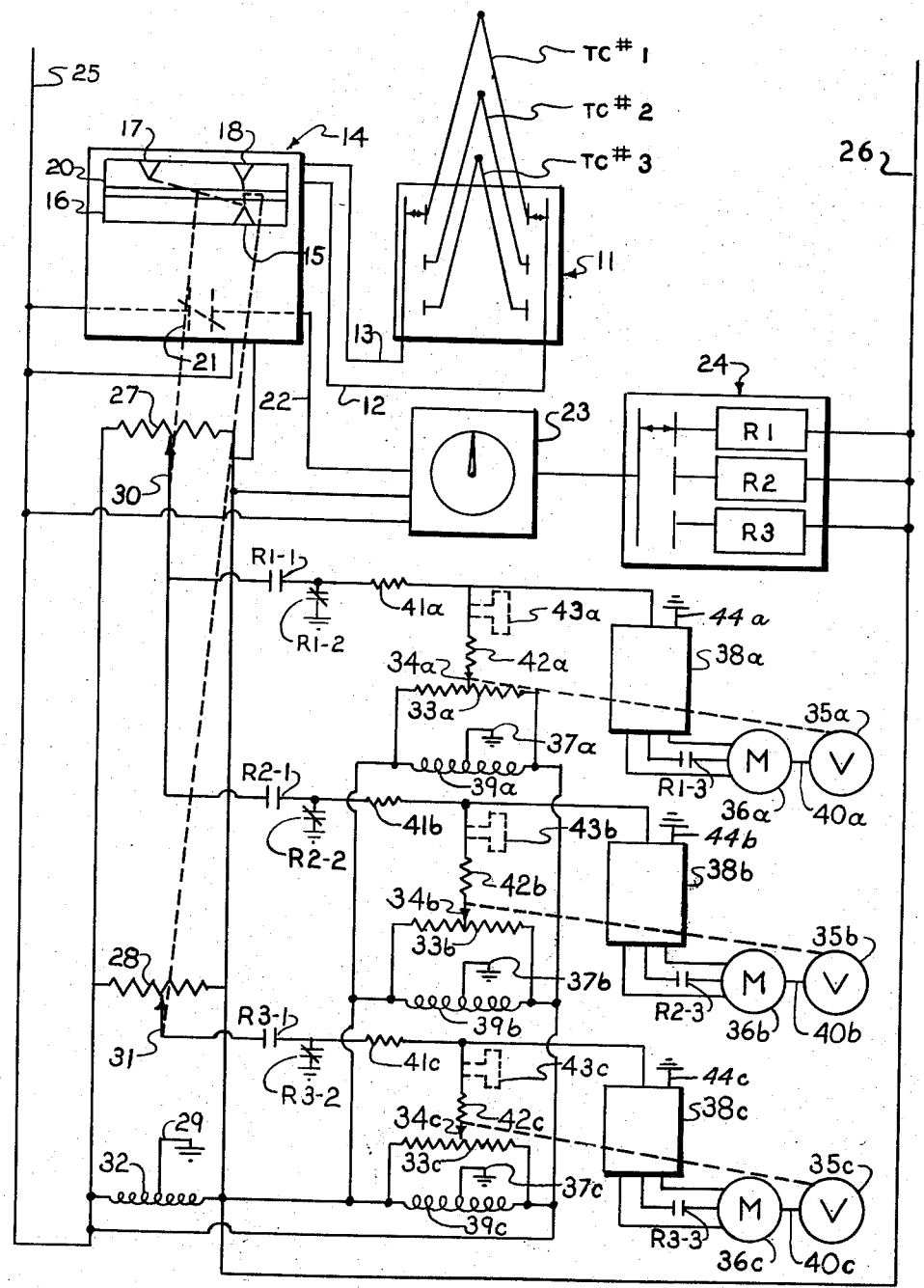

2,849,186

TEMPERATURE RESPONSIVE DEVICE FOR PLURAL ZONE DEW POINT CONTROL

Ralph Hanna, Toledo, Ohio, assignor to Surface Combustion Corporation, Toledo, Ohio, a corporation of Ohio Application July 28, 1955, Serial No. 525,009

9 Claims. (Cl. 236—15)

This invention pertains to a temperature responsive device and more particularly to an electrical system for use with dew point apparatus.

Automatic control of the dew points of gases is a relatively new art. Likewise, control systems for achieving automatic control are relatively new, although reasonably well known to those familiar to the art. However, this invention proposes a system for controlling the dew points of gases in a plurality of spaces. This has not heretofore been successfully accomplished by a single instrument.

Such a system has many uses, as for example, controlling the dew points of the gases produced by a plurality of gas generators and for the atmosphere gases in a plurality of zones in an atmosphere furnace with different dew points desired for more than one zone.

For further consideration of what is novel and my invention, refer to the specification, drawing, and claims.

In the drawing:

The single figure schematically illustrates electrical controls embodying my invention.

Apparatus according to my invention includes a potentiometer and means for indicating in a given sequence the dew points of the gases in the various furnace zones; the potentiometer also contains set pointers for setting the dew points desired for the gases. A first source of voltage is maintained which is responsive to the deviation between the actual and desired dew points. Valves for admitting additional gas to each of the gases being tested are responsive to proportioning amplifiers which are connected by first conductors to the first voltage source and by second conductors to voltage sources which are each responsive to the position of their corresponding valve. In each of the first conductors is a first switch for opening and closing same with the switches being normally opened. There is a ground and a second switch between each first switch and amplifier for grounding the first conductors, with the second switches being normally closed. In addition, there are third switches in the circuit means which connect the proportioning amplifiers and the valves; these switches are normally opened. There are means for selectively controlling the switches and a timer for delaying the activating of any of them for a given period of time after the dew point of one of the gases in the sequence is begun to be measured.

Referring now to the figure, three thermocouples, TC #1, TC #2, and TC #3, may measure the temperatures of three furnace zones or the like or, for my application, measure the temperatures of devices that determine dew points. The devices may be of the type based on fogging a mirror, or the type utilizing hygroscopic salts in the presence of test gases from each of the gas generators or furnace zones whose dew points are to be controlled such as are marketed under the name "Dewcel." In some of these devices the salts are heated until the vapor pressure of the water therein equals the partial pressure of the water vapor in the immediate surrounding atmosphere. At this point, the temperatures of the solutions, as measured by the thermocouples, are a measure of the dew points. In operation, these dew point devices may either continuously or intermittently determine or indicate the dew points. Thus the thermocouples employed may either continuously measure the temperatures of the correct dew points or that of the last measured dew points of the gases. These types of devices are well known in the art and are commercially available.

The selector switch 11 is mechanically indexed to the thermocouple to be used. Leads 12 and 13 connect this thermocouple to recording potentiometer 14 which indicates the temperature by means of pointer 15 on scale 16 and records it at certain intervals on a chart not shown, located within the instrument. This instrument is also commercially available. Two set pointers 17 and 18 are manually set at the temperatures on scale 20 that are desired for the dew points of the various gases being controlled.

A contact switch 21, located within potentiometer 14, closes and opens line 22. Also included in this circuit are timer 23, selector switch 24, and relays R1, R2, and R3. Power is supplied by lines 25 and 26 to actuate recording potentiometer 14, timing mechanism of timer 23, and relays R1, R2, and R3 through line 22. Power is also supplied by lines 25 and 26 to the balance of the circuit shown in Fig. 1. Slidewires 27 and 28, which are actually within potentiometer 14, are provided with contactors 30 and 31. These move along slidewires 27 and 28 according to the position of pointer 15 in relation to set pointers 17 and 18. When pointer 15 is directly under set pointer 17 or 18, corresponding contactor 30 or 31 is in the neutral or central position on slidewire 27 or 28. The movement of the contactors is accomplished by mechanical linkages as shown by dashed lines.

A voltage Es is created from ground 29 across transformer 32 to the point where contactor 30 or 31 touches the corresponding slidewire. The voltage will be zero when the contactor is in its central or neutral position and will increase in magnitude as the contactor deviates from this. Whether the voltage is in or out of phase depends on which side of neutral the contactor is on.

Similar slidewires 33a, 33b, and 33c and contactors 34a, 34b, and 34c are provided for corresponding valves 35a, 35b, and 35c. These contactors are mechanically moved along the slidewires by the corresponding valves as they are opened or closed by the appropriate motors 36a, 36b, and 36c through linkages 40a, 40b, and 40c.

A voltage Ev is created from ground 37a, 37b, or 37c across transformer 39a, 39b, or 39c to the point where contactor 34a, 34b, or 34c touch slidewire 33a, 33b, or 33c. This voltage reacts similarly to that in the potentiometer circuit according to where the contactor is positioned on the slidewire.

Voltages Es and Ev are then fed to the proper proportioning amplifier 38a, 38b, or 38c where the net resultant voltage is amplified and used to actuate the reversible motor 36a, 36b, or 36c. Es and Ev being voltages relative to ground, one side of the input to proportioning amplifiers 38a, 38b, and 38c will be grounds 44a, 44b, and 44c respectively.

A reset action is required in the valve circuit when the temperature setting of pointer 17 or 18 is materially changed. This is necessary to change the effective neutral setting of the contactor 34a, 34b, or 34c on slidewire 33a, 33b, or 33c by adding or reducing resistances. If this were absent, valve 35a, 35b, or 35c would be in a given position for the neutral setting of the contactor regardless of the temperature setting of pointer 17 or 18. This reset action may be provided by additional bridges indicated at 43a, 43b, and 43c.

Relays R1, R2, and R3, previously mentioned, simultaneously actuate their corresponding groups of contacts R1—1, R1—2, R1—3; R2—1, R2—2, R2—3; and R3—1, R3—2, and R3—3. These are shown in Figure 1 in their normally inactivated positions and are oppositely altered when actuated, thus R1—1 is normally opened and R1—2 is normally closed. These ground the line from proportioning amplifier 38a to contactor 30 and effect a simulated neutral position of contactor 30 which prevents false charges from being built up in amplifier 38a. Contact R1—3, located in the neutral or ground line of motor 36a is normally opened and thus prevents any premature operation of the motor. When these relay contacts are actuated by selector switch 24, voltage Es is again fed to proportioning amplifier 38a and the motor's circuit is again closed to enable operation of it. This description similarly applies to the relays in the other two valve circuits.

Proportional resistances 41a, 41b, and 41c and 42a, 42b, and 42c, placed in the instrument slidewire legs and valve slidewire legs respectively, are employed to vary the proportional band or the amount contactors 34a, 34b, and 34c move along slidewires 33a, 33b, and 33c for a given deviation of contactors 30 and 31 on slidewires 27 and 28. In effect, this determines the extent to which valves 35a, 35b, and 35c are turned for a given deviation of temperature or dew point as indicated by potentiometer 14. The resistances are replaceable to permit changing of these proportional bands.

Valves 35a, 35b, and 35c may serve in various applications. For controlling temperature in various furnace zones, the valves may be employed in fuel lines or premix lines to regulate the fuel supply to the burners and thus control heat input. For a gas generator, concerning which the produced gases' dew points are controlled, these valves are used to regulate the air-gas ratio of the supply mixture. For an atmosphere furnace, of which the dew points of the various zones are to be controlled, these valves are utilized in enriching gas lines or air lines to add these products to the basic atmosphere gases and thus vary the dew points of the resultant mixtures.

In operation, with selector switches 11 and 24 closed with respect to thermocouple TC #1 and relay R1, pointer 15 moves across scale 16 to correspond with the temperature sensed by the thermocouple. As pointer 15 moves in relation to set pointers 17 and 18, contactors 30 and 31 move on their respective slidewires and correspondingly change voltages Es. Relay R1 is activated after an amount of time, as determined by timer 23, sufficient for pointer 15 to move to the temperature of thermocouple TC #1. The voltage from contactor 30 is transmitted through contact R1—1 which is closed, due to being activated by relay R1, and is fed to proportioning amplifier 38a. Voltage Ev from contactor 34a is similarly fed to proportioning amplifier 38a with the net voltage being amplified and, with contact R1—3 closed, causing motor 36a to turn in the proper direction which closes or opens valve 35a through linkage 40a. As valve 35a is turned, it mechanically moves contactor 34a on slidewire 33a causing voltage Ev to change. This action occurs until voltage Ev equals Es.

At the end of a specified period of time such as thirty seconds as set by a timing device in potentiometer 14, the temperature is recorded on a chart. Simultaneously thermocouple TC #2 is connected to replace TC #1 in selector switch 11 and relay R2 is placed in the circuit in substitution for R1 in selector switch 24. Relay R2 is not yet actuated, however, due to timer 23. This timer is controlled by contact switch 21 which is normally closed and is mechanically caused to open as the temperature of thermocouple TC #1 is recorded and the selector switches are indexed. The opening of switch 21 causes timer 23 to reset and begin its timing cycle which is for some period of time less than that of the timing period set in potentiometer 14, such as ten seconds. During this period none of the relays are actuated; hence, all of the slidewire circuits are open and no action occurs. At the end of the ten second period, timer 23 is timed out, the circuit is closed, the relay R2 is thus actuated, and voltage Es is now fed to proportioning amplifier 38b. The corresponding valve is then opened or closed in response to its motor and proportioning amplifier until voltages Es and Ev are balanced.

The time interval as set on timer 23 is determined according to the time required for the temperature pointer 15 to move from one end of the scale to the other. Thus, the temperature as measured by TC #1 may be near one end of scale 16 and the temperature measured by TC #2 may be near the other end of the scale. As selector switches 11 and 24 are changed, pointer 15 begins moving toward the temperature sensed by TC #2. Contactor 30 is likewise continuously moved during this period thus continuously changing voltage Es. Without timer 23 to keep the instrument slidewire circuit and the valve motor circuit open, valve 35b would be continuously opening or closing in attempting to balance voltage Ev with voltage Es. This incorrect opening or closing of valve 35b, while pointer 15 is travelling to the true temperature, would cause erroneous changes in the desired temperature or dew point and likewise produce "hunting." By using timer 23 to delay action until it is ascertained pointer 15 is at the true temperature, such error may be avoided. Without this feature, the system is not practically operable.

After the total timing period of thirty seconds in potentiometer 14 has elapsed, the temperature is recorded and the selector switches indexed to their next positions. Again the delay is effected by timer 23 as contact 21 is temporarily opened, causing the timer to again reset and begin timing. The use of a total timing period of thirty seconds permits a net period of twenty seconds in which the valves may be motivated to balance the voltages. The net period must be of sufficient duration to allow the valves to move from one extreme position to the other. This period is then added to that determined by timer 23 to establish the total timing period.

Various modifications may be incorporated in my invention. The use of a larger number of valves is permitted, being limited only by the fact that with only two slidewires only two different temperatures may be used for all the zones or dew points being measured, since only one temperature setting may be used for each slidewire. Additional valves and their circuits may be added in parallel to contactor 30 or 31 and additional temperature settings may be employed by incorporating additional slidewires in instrument 14 or by adding additional instruments. Furthermore, resistance bulbs or similar devices may be used in place of thermocouples. Thus, my disclosure has been developed to serve in a descriptive and not a limiting sense.

I claim:

1. Control apparatus for maintaining dew points of a plurality of separate gases comprising: a device for each of said gases whose temperature indicates the dew point of the corresponding gas; a thermocouple in each device for measuring the temperature thereof; a recording potentiometer; a selector switch for connecting said potentiometer singly to each of the thermocouples in a predetermined sequence; means in said potentiometer for singly indicating and recording the temperature of each thermocouple when connected therewith; set pointers in said potentiometer for setting the temperatures desired for said devices; a first source of voltage responsive to the deviation between the desired temperature and the actual temperature of each device; a source of gas; a valve corresponding to each thermocouple for admitting gas from said source to each of the plurality of gases; a second source of voltage responsive to the position of each valve; a motor for opening and closing each of said valves; a proportioning amplifier for each of the motors; first electrical conductors connecting said first voltage source and each amplifier; second electrical conductors connecting said second voltage source and each amplifier, with each amplifier amplifying the difference in voltage between the two sources; circuit means connecting each amplifier and its corresponding motor, with each said motor actuated according to the voltage amplified by the corresponding amplifier; a normally open first switch in each first conductor for opening and closing circuits therethrough; a normally closed second switch connecting each of said first conductors, between said first switches and said amplifiers, to ground; a normally open third switch for opening and closing each circuit means; a second selector switch for actuating each of the first, second, and third switches according to the corresponding dew point device, thermocouple, valve, motor, and amplifier; and a timing device, actuated each time a dew point temperature is recorded by the indicating and recording means, to delay actuating the switches for a period of time, said period being long enough for the indicating means to indicate the actual dew point temperature measured by the next succeeding thermocouple.

2. Control apparatus for maintaining the dew points of a plurality of separate gases comprising, in combination: means responsive to the dew point of each gas; a potentiometer for indicating dew points; first selector means for sequentially connecting said responsive means to said potentiometer; set pointers in said potentiometer for setting the dew points desired for the gases; a first source of voltage responsive to the deviation between the desired and actual dew points; a proportioning amplifier for each responsive means; valves each adjustable responsive to a proportioning amplifier for controlling each of the gases; a second source of voltage responsive to the position of each valve; first conductors connecting said first voltage source to each of said amplifiers; second conductors connecting each of the second sources of voltage to their corresponding amplifiers; circuit means for connecting said proportioning amplifiers each with the corresponding valves; a first switch for each first conductor for opening and closing a circuit therethrough, said switch being closed when activated and opened when inactivated; a ground corresponding to each of said first conductors and located between said first contact switch and the corresponding amplifier; a second switch for each second conductor for connecting and disconnecting each ground with the corresponding first conductor, said ground being disconnected when second switch is inactuated; a third switch for opening and closing each connection between said amplifiers and valves in said circuit means, said third switches being closed when actuated and opened when inactuated; second selector means for sequentially actuating said first, second, and third relay switches; and a timer for delaying actuation of the switches by said second selector means for a predetermined period of time after each responsive means is initially connected to said potentiometer.

3. Apparatus for maintaining the temperatures of a plurality of zones in a furnace comprising: a temperature measuring device for each of said zones; a potentiometer; selector means for periodically indicating on said potentiometer the actual temperature measured by each device; set pointers in said potentiometer for setting the temperature desired for each of the zones; a first source of current responsive to the deviation between the desired and actual temperatures; a burner for each zone; a valve for controlling flow of fuel to each burner; a second source of current responsive to the position of each of the valves; means for changing the position of each of the valves in response to the difference between the currents of said first and second sources; a selector switch for sequentially actuating each of the valve position means; means for indexing said selector switch and said selector means at periodic intervals; and a timing device for delaying the actuating of said valve position means for a period of time after the selector switch is indexed.

4. Control apparatus for maintaining dew points of a plurality of separate gases comprising: a dew point measuring device for each of said gases; a potentiometer; means for singly indicating on said potentiometer the dew point measured by each device; set pointers in said potentiometer for setting the dew point desired for the gases; a first source of current responsive to the deviation between the desired and actual dew points; a valve for each of said gases controlling flow of additional gas thereto; a second source of current responsive to the position of each of the valves; and means for changing the position of each of the valves in response to the difference between the currents of said first and second sources.

5. Control apparatus for maintaining dew points of a plurality of separate gases comprising: a dew point measuring device for each of said gases; a potentiometer; means for singly indicating on said potentiometer the dew point measured by each device; set pointers in said potentiometer for setting the dew point desired for the gases; a first source of current responsive to the deviation between the desired and actual dew points; a valve for each of said gases controlling flow of additional gas thereto; a second source of current responsive to the position of each of the valves; means for changing the position of each of the valves in response to the difference between the currents of said first and second sources; a selector switch for actuating each of the valve position means; means for indexing said selector switch at periodic intervals; and a timing device for delaying the actuating of the valve position means for a period of time after the selector switch is indexed.

6. Apparatus for maintaining the dew point of each gas of a plurality of gases comprising, in combination: means for measuring the actual dew point of each gas; a potentiometer; means in said potentiometer for indicating the dew point temperature of each gas in periodic sequence; means for setting the desired dew point temperature of each gas; a first source of current responsive to the deviation between the actual and desired dew point temperatures; a valve corresponding to each of the first sources for controlling flow of additional gas to each of the gases; a second source of current responsive to the position of each of the valves; means for controlling each of said valves in response to the difference between the current of the corresponding first and second sources; a selector switch for controlling each first source, valve, and second source to correspond with the dew point being measured; and delay means for initially inactivating said first source of current and the means for controlling each of said valves for a given amount of time in each period during which the indicated dew point of the next gas in sequence becomes equal to its actual dew point.

7. Apparatus for controlling the dew points of a plurality of gases comprising, in combination: means for measuring and indicating the actual dew points of each gas in a predetermined sequence; a first source of current responsive to the deviation between the actual and desired dew points; a valve for each gas for admitting an additional gas thereto; a second source of current for each valve responsive to the position thereof; means for changing said position in response to the difference in current between said first and second sources; means for actuating the first source, valve, and second source that correspond to the gas whose dew point is being measured; and a delay mechanism for inactuating the actuating means for a given period of time after the dew point of the next succeeding gas in sequence is begun to be measured.

8. Control apparatus for maintaining dew points of a plurality of separate gases comprising: a device for each of said gases whose temperature indicates the dew point of the corresponding gas; a thermocouple in each device for measuring the temperature thereof; a recording potentiometer; a selector switch for connecting said potentiometer singly to each of the thermocouples in a predetermined sequence; means in said potentiometer for singly indicating and recording the temperature of each thermocouple when connected therewith; a first source of voltage responsive to the deviation between the desired temperature and the actual temperature of each device; a source of gas; a valve corresponding to each thermocouple for admitting gas from said source to each of the plurality of gases; a second source of voltage responsive to the position of each valve; a motor for opening and closing each of said valves; a proportioning amplifier corresponding to each of the motors; first electrical conductors connecting each first voltage source and the corresponding amplifier; second electrical conductors connecting each second voltage source and the corresponding amplifier, with each amplifier amplifying the difference in voltage between the corresponding two sources; circuit means connecting each amplifier and its corresponding motor, with each motor actuated according to the voltage amplified by the corresponding amplifier; a normally opened first switch in each first conductor for opening and closing circuits therethrough; a normally closed second switch connecting each first conductor, between the corresponding first switch and amplifier, to ground; a normally opened third switch for opening and closing each circuit means; a second selector switch for simultaneously actuating each of the first, second, and third switches according to the corresponding dew point device, thermocouple, valve, motor, and amplifier whereby said switches will be changed from their normal positions to their actuated positions and the corresponding first conductor will be closed, its ground disconnected, and the corresponding circuit means closed; and a timing device actuated each time a dew point temperature is recorded by the indicating and recording means, to delay actuating the switches for a predetermined period of time, said period being long enough for the indicating means to indicate the actual dew point temperature measured by the next succeeding thermocouple.

9. Control apparatus for maintaining dew points of a plurality of separate gases comprising: a device for each of said gases whose temperature indicates the dew point of the corresponding gas; a thermocouple in each device for measuring the temperature thereof; a recording potentiometer; a selector switch for connecting said potentiometer singly to each of the thermocouples in a predetermined sequence; means in said potentiometer for singly indicating and recording the temperature of each thermocouple when connected therewith; a first source of voltage responsive to the deviation between the desired temperature and the actual temperature of each device; a source of gas; a valve corresponding to each thermocouple for admitting gas from said source to each of the plurality of gases; a second source of voltage responsive to the position of each valve; a motor for opening and closing each of said valves; a proportioning amplifier corresponding to each of the motors; first electrical conductors connecting each first voltage source and the corresponding amplifier; second electrical conductors connecting each second voltage source and the corresponding amplifier, with each amplifier amplifying the difference in voltage between the corresponding two sources; circuit means connecting each amplifier and its corresponding motor, with each motor actuated according to the voltage amplified by the corresponding amplifier; a normally opened first switch in each first conductor for opening and closing circuits therethrough; a normally closed second switch connecting each first conductor, between the corresponding first switch and amplifier, to ground; a normally opened third switch for opening and closing each circuit means; a second selector switch for simultaneously actuating each of the first, second, and third switches according to the corresponding dew point device, thermocouple, valve, motor, and amplifier whereby said switches will be changed from their normal positions to their actuated positions and the corresponding first conductor will be closed, its ground disconnected, and the corresponding circuit means closed; a first timing device, actuated each time the dew point temperature is recorded by the indicating and recording means, to delay actuating the switches for a predetermined period of time, said period being long enough for the indicating means to indicate the actual dew point temperature measured by the next succeeding thermocouple; and a second timing device, in said potentiometer, for actuating said indicating and recording means at equally spaced intervals, said intervals being longer than the predetermined period of time produced by said first timing device.

References Cited in the file of this patent

UNITED STATES PATENTS

| | | |
|---|---|---|
| 1,898,124 | Harrison | Feb. 21, 1933 |
| 1,925,463 | Schmidt | Sept. 5, 1933 |
| 2,436,720 | Jones | Feb. 24, 1948 |

OTHER REFERENCES

Gildersleeve, pages 12, 13 and 14 of "Instrumentation," volume 3, Number 1, the fourth quarter of 1947.